United States Patent
Ponzini et al.

(10) Patent No.: US 11,284,304 B2
(45) Date of Patent: Mar. 22, 2022

(54) ALLOCATION OF TRANSPORT RESOURCES

(71) Applicant: Telefonaktiebolaget LM Ericsson (publ), Stockholm (SE)

(72) Inventors: Filippo Ponzini, Pisa (IT); Giulio Bottari, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/629,598

(22) PCT Filed: Jul. 21, 2017

(86) PCT No.: PCT/EP2017/068475
§ 371 (c)(1),
(2) Date: Jan. 9, 2020

(87) PCT Pub. No.: WO2019/015780
PCT Pub. Date: Jan. 24, 2019

(65) Prior Publication Data
US 2020/0404544 A1 Dec. 24, 2020

(51) Int. Cl.
*H04W 28/18* (2009.01)
*H04B 17/318* (2015.01)
(Continued)

(52) U.S. Cl.
CPC ............ *H04W 28/18* (2013.01); *H04B 7/043* (2013.01); *H04B 7/0404* (2013.01); *H04B 7/0408* (2013.01); *H04B 7/0413* (2013.01); *H04B 7/0417* (2013.01); *H04B 7/0452* (2013.01); *H04B 7/061* (2013.01); *H04B 7/0617* (2013.01); *H04B 7/0619* (2013.01);
(Continued)

(58) Field of Classification Search
CPC ... H04W 28/18; H04W 72/046; H04W 24/10; H04W 72/042; H04W 72/0413; H04W 16/28; H04B 7/061; H04B 7/043; H04B 7/0404; H04B 17/336; H04B 17/318; H04B 7/0408; H04B 7/0413; H04B 7/088; H04B 7/0619; H04B 7/0634; H04B 7/0626; H04B 7/0632; H04B 7/0617; H04B 7/0417; H04B 7/0452
See application file for complete search history.

(56) References Cited

U.S. PATENT DOCUMENTS

2010/0120418 A1* 5/2010 Agarwal ............ H04B 7/18515
455/427
2012/0236774 A1* 9/2012 Guey .................... H04W 28/16
370/312
(Continued)

*Primary Examiner* — Fred A Casca
(74) *Attorney, Agent, or Firm* — Christopher & Weisberg. P.A.

(57) ABSTRACT

A method of allocating transport resources to beams in a network area, wherein the beams comprise beam formed radio channels (505, 507, 513, 515) between antenna points (509, 511, 517) and wireless devices (501, 503) in the network area. The method comprises receiving candidate beam information relating to a plurality of candidate beams for use in future communications between antenna points and wireless devices (201); and allocating transport resources to one or more antenna points in the network area based on the candidate beam information (203).

15 Claims, 9 Drawing Sheets

(51) Int. Cl.

| | |
|---|---|
| *H04B 17/336* | (2015.01) |
| *H04B 7/0404* | (2017.01) |
| *H04B 7/0408* | (2017.01) |
| *H04B 7/0413* | (2017.01) |
| *H04B 7/0417* | (2017.01) |
| *H04B 7/0426* | (2017.01) |
| *H04B 7/0452* | (2017.01) |
| *H04B 7/06* | (2006.01) |
| *H04B 7/08* | (2006.01) |
| *H04W 16/28* | (2009.01) |
| *H04W 24/10* | (2009.01) |
| *H04W 72/04* | (2009.01) |

(52) U.S. Cl.
CPC ......... *H04B 7/0626* (2013.01); *H04B 7/0632* (2013.01); *H04B 7/0634* (2013.01); *H04B 7/088* (2013.01); *H04B 17/318* (2015.01); *H04B 17/336* (2015.01); *H04W 16/28* (2013.01); *H04W 24/10* (2013.01); *H04W 72/042* (2013.01); *H04W 72/046* (2013.01); *H04W 72/0413* (2013.01)

(56) References Cited

U.S. PATENT DOCUMENTS

| | | |
|---|---|---|
| 2013/0121185 A1 | 5/2013 | Li et al. |
| 2014/0307654 A1 | 10/2014 | Kim |
| 2017/0250747 A1* | 8/2017 | Reinhardt ................ H04L 1/00 |

* cited by examiner

ALLOCATION OF TRANSPORT RESOURCES

TECHNICAL FIELD

Methods and apparatus are disclosed for allocating transport resources to beams in a network area. In particular, embodiments described herein make use of the knowledge of candidate beams for communication with particular wireless devices in the network area, in order to allocate transport resources to different antenna points in the network area.

BACKGROUND 5G systems are expected to support high-mobility scenarios with extensive use of beamforming. It means that radio beams, able to follow a single user or a small set of users within a network area, will be the new providers of the radio coverage in the place of the traditional radio cells.

To enable the capacity, data rates, and coverage which may be required in the 5G era, the concept of beam formed radio transmissions has been introduced for both high and low frequencies. A beam may be defined as a combination of downlink, and optionally uplink radio resources, allocated from one antenna point where usage per Transmission Time Interval (TTI) is characterized, for example, by direction, output power, antenna gain, beam pattern, carrier frequency, carrier bandwidth and/or one or more reference symbols types.

In the following network description, the term Antenna Point (AP) will be used to indicate the Radio Unit located at the antenna side, and the term Access Node (AN) will be used to indicate the node where the baseband processing is located. It will be appreciated that multiple APs may share the same AN.

A notion for 5G may be that, for the wireless terminal the concept of cells is removed and, instead, the wireless device is only aware of a particular beam with which the wireless terminal is currently connected. It is the responsibility of the network to move this link-beam connection between different APs as and when required.

Current radio access network (RAN) transport networks have been configured for radio base station (RBS) backhauling, and they provide almost static radio cell coverage. The peak data rate offered by each radio cell is shared among many users, and it is therefore practical to dimension backhaul links for conventional radio cells near the radio peak value offered by each cell. In other words, the backhaul links are dimensioned so that they are capable of providing a peak number of transport resources, for example, they may have peak bandwidth.

Since the concept of cell coverage may be replaced by the concept of beam coverage in 5G, each radio node may be demanded to support many beams; where each beam will be dynamically created, moved and destroyed according to the service to be offered to each user. Current radio transport networks may not be optimized for the 5G scenario. Dimensioning each transport link to a beam peak traffic value may not be feasible, at least not at a reasonable cost, and new solutions must therefore be found to avoid transport bandwidth overprovisioning.

SUMMARY

According to the present disclosure there is provided a method of allocating transport resources to beams in a network area, wherein the beams comprise beam formed radio channels between antenna points and wireless device in the network area. The method comprises receiving candidate beam information relating to a plurality of candidate beams for use in future communications between antenna points and wireless device; and allocating transport resources to one or more antenna points in the network area based on the candidate beam information.

According to another aspect of the disclosure there is provided a transport management entity. The transport management entity comprises a receiving module for receiving candidate beam information relating to a plurality of candidate beams for use in future communications between antenna points and wireless device; and a transport resource allocation block configured to allocate transport resources to one or more antenna points in the network area based on the candidate beam information.

According to another aspect of the disclosure there is provided a beam mobility entity for storing beam status information about a wireless device communicating with antenna points in a network area. The beam mobility entity comprises a beam status database comprising beam status information. The beam status information comprises: current beam information comprising information relating to a plurality of beams providing communication between a plurality of antenna points and wireless device; transport resource information comprising information relating to transport resources with which the wireless device are communicating with the antenna points; and candidate beam information comprising information relating to a plurality of candidate beams for each of the plurality of wireless device, wherein the candidate beams are potential beams for use in future communications with each of the respective wireless device.

According to another aspect of the disclosure there is provided a transport management entity comprising a processor and a memory, said memory containing instructions executable by said processor. The processor is operative to: receive candidate beam information relating to a plurality of candidate beams for use in future communications between antenna points and wireless device; and allocate transport resources to one or more antenna points in the network area based on the candidate beam information.

According to another aspect of the disclosure there is provided a beam mobility entity comprising a processor and a memory, said memory containing instructions executable by said processor. The memory is operative to store: current beam information comprising information relating to a plurality of beams providing communication between a plurality of antenna points and wireless device; transport resource information comprising information relating to transport resources with which the wireless device are communicating with the antenna points; and candidate beam information comprising information relating to a plurality of candidate beams for each of the plurality of wireless device, wherein the candidate beams are potential beams for use in future communications with each of the respective wireless device.

According to another aspect of the disclosure there is provided a computer program, comprising instructions which, when executed on at least one processor, cause the at least one processor to carry out a method as described above.

According to another aspect of the disclosure there is provided a computer program product comprising a computer program as described above.

BRIEF DESCRIPTION OF THE DRAWINGS

For a better understanding of the present disclosure, and to show how it may be put into effect, reference will now be made, by way of example only, to the accompanying drawings, in which:—

DETAILED DESCRIPTION

Figure 1:
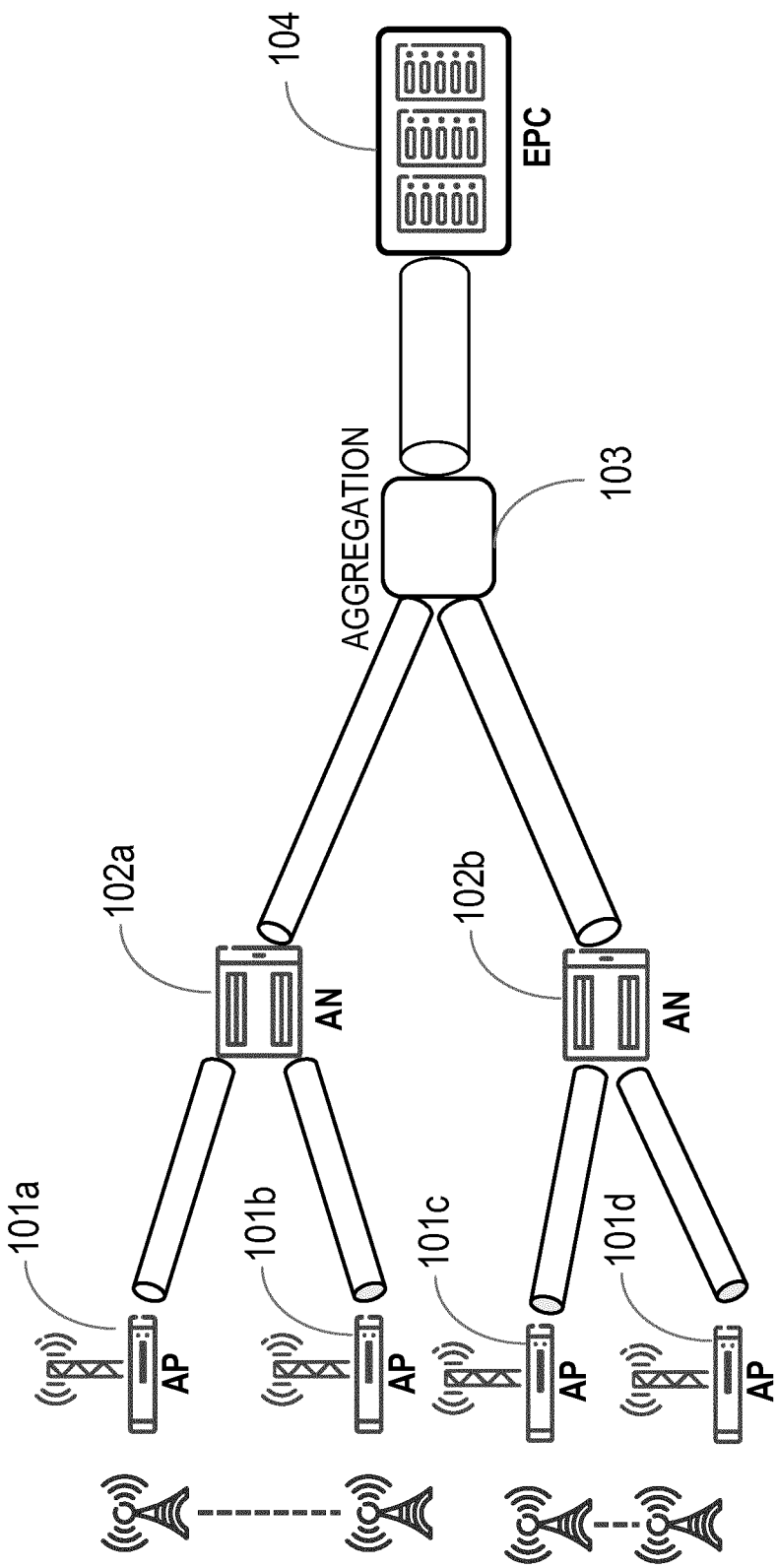
FIG. 1 illustrates a dimensioning approach in a logical topology representation.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless device, it should be understood by those skilled in the art that "wireless device" is a non-limiting term comprising any mobile or wireless device, terminal, user equipment (UE) or node equipped with a radio interface allowing for at least one of: transmitting signals in uplink (UL) and receiving and/or measuring signals in downlink (DL). A wireless device herein may comprise a wireless device (in its general sense) capable of operating or at least performing measurements in one or more frequencies, carrier frequencies, component carriers or frequency bands. It may be a "UE" operating in single, or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target devices, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In the embodiments described herein, the term "Antenna Point" (AP) will be used to indicate the Radio Unit located at the antenna side, and the term "Access Node" (AN) will be used to indicate the node where the baseband processing is located. It will be appreciated that multiple APs may share the same AN.

In the embodiments described herein, the term "beam" will be used to describe a radio beam, for example a radio beam used in 5G systems, whereby high-mobility scenarios are provided using beamforming. The use of beams allows radio coverage to be provided to a single user or a small set of users within a network area, in the place of, or as an alternative to the traditional radio cells. A beam may therefore comprise a beam formed radio channel, for example between an antenna point and a wireless device in the network area. As indicated earlier, a beam may be defined as a combination of downlink, and optionally uplink radio resources, allocated from one antenna point where usage per Transmission Time Interval (TTI) is characterized, for example, by direction, output power, antenna gain, beam pattern, carrier frequency, carrier bandwidth and/or one or more reference symbols types.

In the following description the term "transport resources" is used to describe the physical and logical resources used to transport network traffic. The transport resources may be defined by, for example, the bandwidth, peak data rates and any other one or more parameters relating to the resources available.

The present disclosure provides methods and apparatus for allocating transport resources to beams in a network area. In particular, the embodiments described herein relate to receiving candidate beam information relating to beams which may be used in future communications between antenna points and one or more wireless devices, and using this candidate beam information to determine how to allocate transport resources to the antenna points in the network area.

In ideal radio conditions, when utilizing radio beams, the user throughput may reach the air interface cell peak bit rate. However, in reality the user throughput for users being serviced by a beam will be a distribution due to wireless devices experiencing a variety of radio conditions within the coverage area of the servicing radio beam. Receiving an air interface peak bit rate is improbable in such a distribution.

In other words, the probability that three independent wireless devices, being serviced by three separate beams at the same time instant, happen to be situated in the most optimal place from a radio point of view in their beam coverage area, is exceedingly unlikely. In other words, it is very unlikely that a wireless device situated within a beam will use the peak data rates. Therefore, the overprovisioning of resources may be avoided by dimensioning the access connections to provide peak data rates and/or peak bandwidth but dimensioning the subsequent levels for an average load.

FIG. 1 shows a radio access network, and illustrates a dimensioning approach in a logical topology representation. The antenna points 101a to 101d are configured to communicate with the access nodes 102a and 102b. For example, the antenna points 101a and 101b are, in this example, communicating with the access node 102a, and the antenna points 101c and 101d are, in this example, communicating with the access node 102b.

The communications between the antenna points 101 and the access nodes 102 are dimensioned with peak transport resources, for example, with a maximum data rate or maximum bandwidth. In other words, any antenna point requiring a maximum number of transport resources may be able receive the maximum number of transport resources from the access node 102 to which it is connected. In some examples, the connections between the antenna points 101 and the access nodes 102 are configured as microwave peer-to-peer (P2P) links or optical P2P links In contrast, the connections between the access nodes 102 and an aggregation node 103 are dimensioned with average transport resources. In other words, it is presumed that the data required to be transferred over the connections between the access nodes 102 and the aggregation node 103 will not be equivalent to a sum of the peak transport resources across each of the connections between the access nodes 102 and the antenna points 101. In other words, not all connected antenna points will be requesting peak transport resources at the same time. The connection between the aggregation node 103 and the Evolved Packet Core (EPC) 104 may then be dimensioned as the sum of the connections between the access nodes 102 and the aggregation node 103.

However, with the amount of traffic expected in 5G, dimensioning the access links between the antenna points 101 and the access nodes 102 with a peak approach, may lead to large bandwidth requirements for the underlying transport network.

Figure 2:
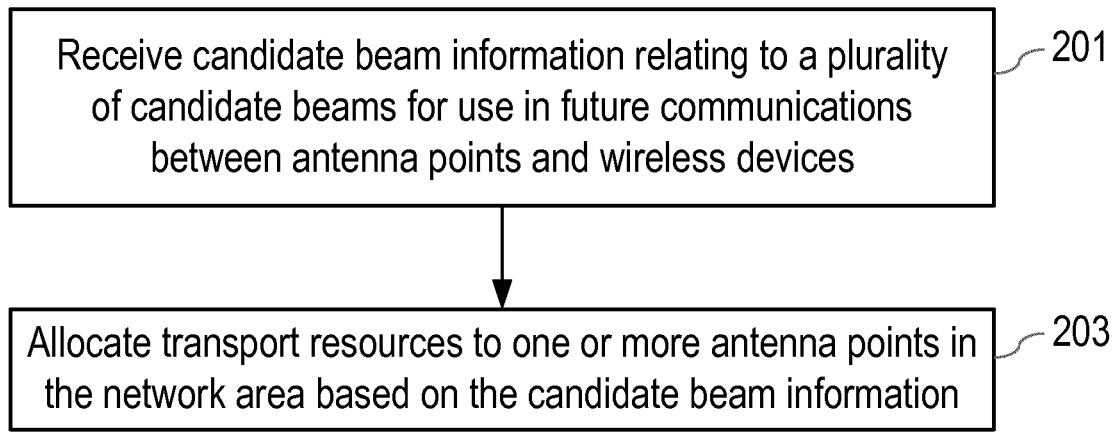
FIG. 2 illustrates a method of allocating transport resources to beams in a network area according to some embodiments.

FIG. 2 illustrates a method of allocating transport resources to beams in a network area according to some embodiments. In this disclosure, beams may comprise beam formed radio channels between antenna points and wireless devices in the network area.

In step 201, the method comprises receiving candidate beam information relating to a plurality of candidate beams for use in future communications between antenna points and wireless devices.

In step 203, the method further comprises allocating transport resources to one or more antenna points in the network area based on the candidate beam information.

In other words, as will be described in more detail below, the method may make use of the candidate beam information, which alerts the network of changes in radio traffic distribution, for example beam mobility between wireless devices and a plurality of candidate beams to which they may handover, to predict which nodes of the network will require more or less transport resources than they are currently provided with.

The transport resources may be allocated for either uplink communication, downlink communication, or both uplink and downlink communication.

By reallocating the transport resources based on the candidate beam information, the method can help prevent, or greatly reduce, overprovisioning of the transport network, as the transport resources are allocated as and when they are needed by each beam. Furthermore, 5G Network slicing may be made more efficient as resources are not used for overprovisioning when setting-up slices. For example, in conventional backhaul, the transport resources from the AP to the Core Network may be dimensioned on the peak rate of all the radio beams hosted by the AP, which results in overprovisioning of transport resources. By following the beams, the transport resources can be configured "on-demand" for the exact amount required to carry the traffic on each radio beam.

In some embodiments, the candidate beam information is provided using an Active Mode Mobility (AMM) procedure. In this procedure, a wireless device may be unaware of which AP and which AN the wireless device is connected to and, if the AP changes, the wireless device may be unaware of this change. Therefore, each wireless device may have a connection to the radio network which, from the wireless device perspective, is unchanged if it remains in an active mode.

The network may request, for example, that the wireless device perform generic measurements which allow the network itself to select the best AP and the best beam to serve the wireless device. The same connection and identities may be used for the wireless device regardless of the AP and the beam chosen.

The AMM procedure does not therefore rely on any predefined "always on" broadcast pilots on which the wireless device can perform mobility measurements on. In contrast, the network plays an active role in detecting when neighbor beam candidate measurements may be needed.

In some embodiments, the network may order the wireless device to transmit uplink sounding sequences which the network can measure in uplink for different candidate mobility beams.

In some embodiments the network may turn on, on-demand, downlink Mobility Reference Sequence (MRS) pilots for different candidate mobility beams. The wireless device may measure the MRS pilots and report back indicating the quality of the receiving of the MRS pilots for the different candidate beams. It is noted that the wireless device may not be able to make any implicit cell/beam identification from the MRS. What the MRS represents may only be identifiable by the network.

Figure 3:
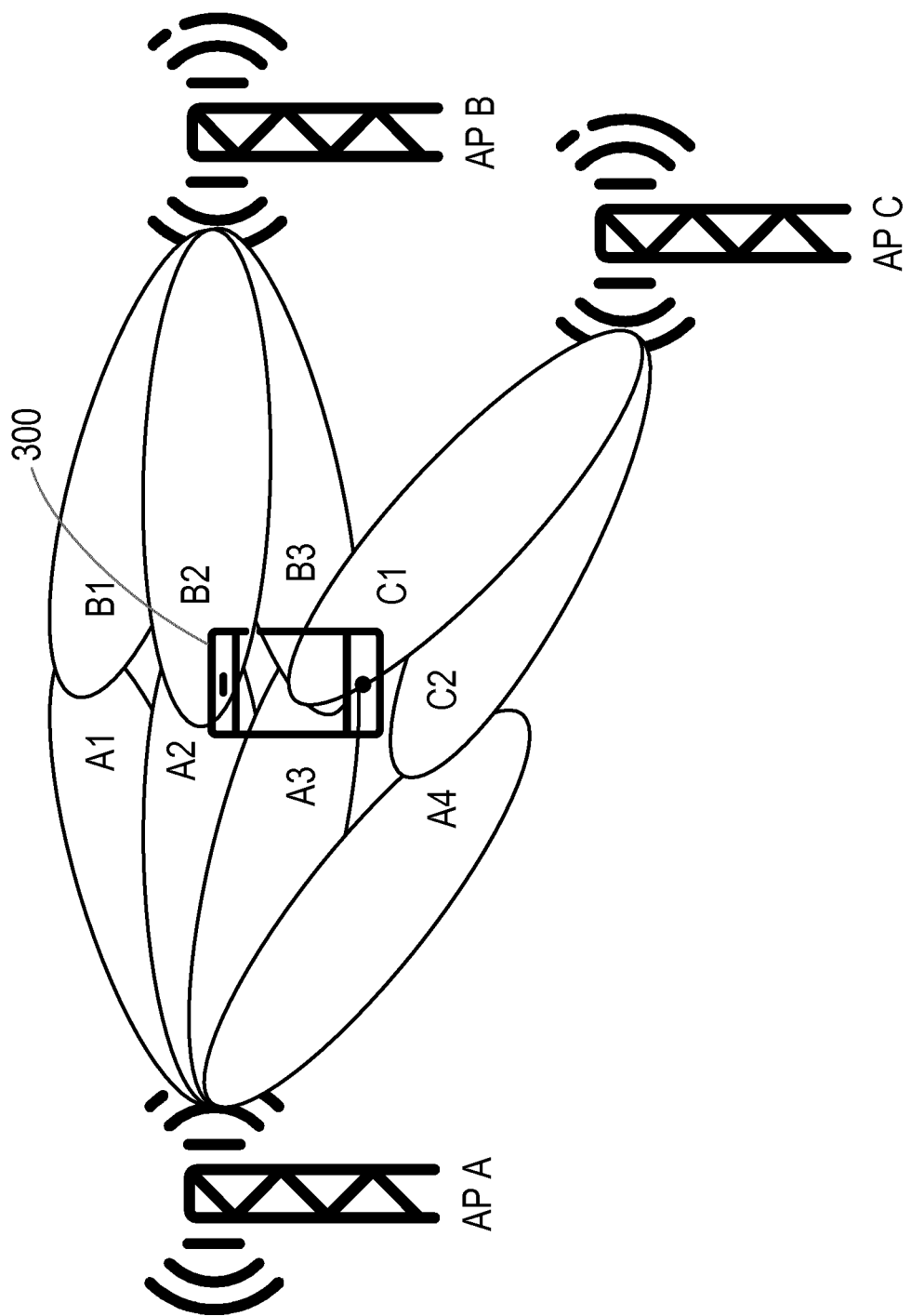
FIG. 3 illustrates a pool of candidate beams according to some embodiments.

By using one or both of the above measurements, the network may identify a pool of candidate beams as illustrated in FIG. 3. In this example, the wireless device 300 is currently being serviced by the beam B2 from the antenna point $AP_B$. However, the measurements made by the wireless device 300 have identified to the network that the beams A1, A2, A3 and A4 originating from the antenna point $AP_A$ may be potential candidate beams for future communications. The network has also identified the beams B1 and B3 as potential candidate beams originating from the antenna point $AP_B$ for future communications. The network has also identified the beams C1 and C2 originating from the antenna point $AP_C$, as candidate beams for future communications.

The network may then select from the candidate beams a best mobility beam for the wireless device 300 based on the measurements or sounding sequences. The network may then move the communications between the wireless device 300 and the network to the best mobility beam.

This procedure may typically be used for downlink beam identification. For uplink communications the network may select the antenna point AP and the beam that will receive traffic from the wireless device. This selection may be done by operating measurements at the network side.

Figure 4:
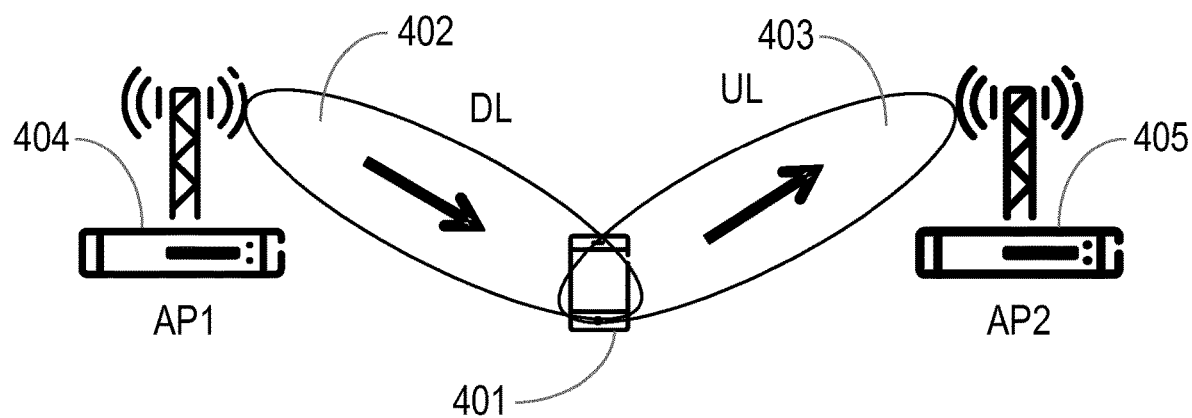
FIG. 4 illustrates downlink and uplink decoupling for communications with a wireless device according to some embodiments.

In other words, the result of the AMM procedure may be a downlink and uplink decoupling. For example, as shown in FIG. 4, a wireless device 401 may have downlink communications serviced by a first beam 402 and uplink communications serviced by a second beam 403. In particular, the first beam 402 may connect the wireless device 401 to a first antenna point 404 and the second beam 403 may connect the wireless device 401 to a second antenna point 405. In other words, the uplink and downlink communications may be serviced by different antenna points. However, as discussed earlier, the wireless device 401 may be unaware that the uplink and downlink communications are being serviced by different beams.

Figure 5:
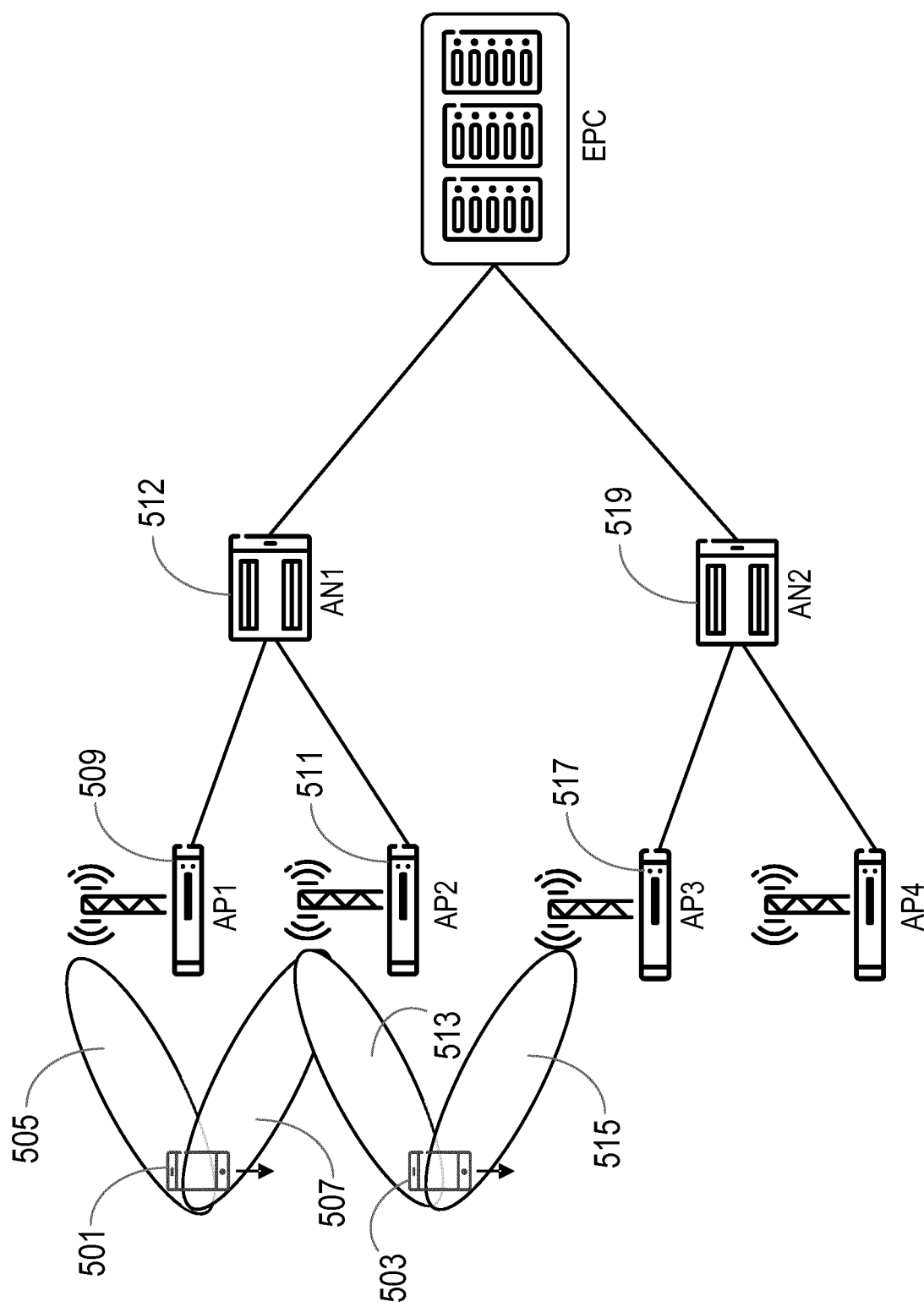
FIG. 5 illustrates two possible scenarios for beam mobility in a network area according to some embodiments.

FIG. 5 illustrates two possible scenarios for beam mobility in a network area. In this example, the beam mobility is triggered by the movement of the wireless terminals 501 and 503.

For the wireless device 501 the movement of the wireless device 501 results in the network selecting that the wireless device 501 hands over from beam 505 to beam 507. In this scenario the beam hand-over involves different antenna points, i.e. the antenna points 509 and 511. However, for this example hand-over the antenna points 509 and 511 are connected to the same access node 512. In this example, therefore, the transport resources, for example the bandwidth, in the access node to EPC connection are not affected, i.e. since this is an intra-AN beam hand-over.

For the wireless device 503, the movement of the wireless device 503 results in the network selecting that the wireless device 503 hands over from the beam 513 to the beam 515. In this scenario, the beam hand-over involves different antenna points, i.e. the antenna points 511 and 517. However, for this example hand-over the antenna points 511 and 517 are connected to different access nodes, i.e. the access nodes 512 and 519. In this example, therefore, the transport resources, for example, the bandwidth, in the connections between the access nodes 512 and 519 and the EPC may be affected.

It may therefore, in some scenarios, be beneficial to reallocate the transport resources allocated at the different access nodes and antenna points when the wireless devices are expected to hand over. In some cases, a reallocation of transport resources may be beneficial also between APs afferent to the same AN. However if the links subtended between APs and ANs are P2P links, dimensioned on the peak, the reallocation for these particular network segments may not be useful.

Figure 6:
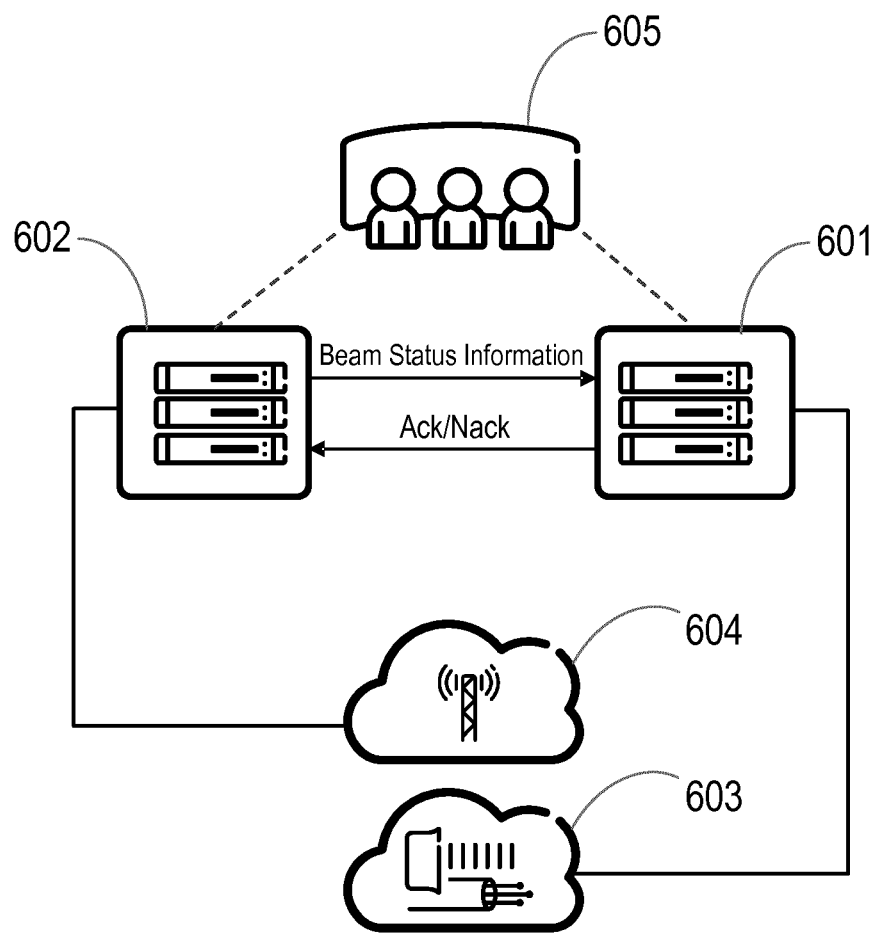
FIG. 6 illustrates a network system according to some embodiments.

FIG. 6 illustrates a network system according to some embodiments. The method as described in FIG. 2 may be performed by a transport management entity (TME). For example, as shown in FIG. 6, a TME 601 may receive beam status information. In particular, the beam status information may comprise the candidate beam information.

The TME may compute any transport changes required in the transport network 602 based on the candidate beam information. In other words, it may allocate transport resources to the different antenna points in the network area. The TME 601 may be a part of a transport control system 603.

A radio control system 604 may comprise a Beam Mobility Entity (BME) 602. The BME may comprise a database for tracking the status of the beams operating in the network area. It may also track the candidate beams for each wireless device in the network area.

The BME 602 and TME 601 may be connected to a network operation center 605.

In some embodiments the TME 601 may send a control message, or an ACK/NACK control message, indicating to the BME 602 whether a particular wireless device requirements for a candidate beam may be satisfied.

In some embodiments, the method described earlier in FIG. 2 may further comprise receiving current beam information. The current beam information comprises information relating to a first beam providing communication between a first antenna point and a first wireless device. In other words, the current beam information comprises information relating to the beams currently in use in the network area. The method may also comprise receiving transport resource information. The transport resource information comprises information relating to a first plurality of transport resources with which the first wireless device is communicating with the first antenna point. In other words, the transport resource information comprises information relating to the transport resources, e.g. bandwidths currently used by the beams in the network area.

In other words, the beam status information transmitted from the BME 602 to the TME 601 in FIG. 6 may comprise the candidate beam information, current beam information and/or transport resource information.

The method may also comprise receiving candidate beam information, where the candidate beam information comprises information relating to a first candidate beam between a second antenna point and the first wireless device. In other words, the candidate beam information may specify a first candidate beam, which may be the best mobility beam for a particular wireless device.

This first candidate beam may be determined, for example, by the AMM procedure described earlier. For example, the method may comprise sending a request to the first wireless device to perform measurements of a plurality of candidate beams, receiving signalling from the first wireless device representative of the measurements on the plurality of candidate beams, and selecting the first candidate beam from plurality of candidate beams based on the received signalling from the first wireless device. In some embodiments, these steps of the method may be performed by a radio scheduler.

In other words, as previously described the behavior of each wireless device is partially predictable, because the AMM procedure identifies a set of candidate beams among which it will be selected "the next" beam that will serve each moving UE. So the possible "next" APs and ANs will be identified for each UEs. In other words, the candidate beam information identifies the first candidate beam as the next beam for the first wireless device.

The method may then also comprise allocating at least a portion of the first plurality of transport resources to one of the first antenna point and second antenna point, or between the first antenna point and second antenna point, based on the current beam information, the transport resource information and the candidate beam information.

By receiving input from the radio scheduler, the TME can pre-allocate a transport resource for the antenna point of the "beam acceptor", i.e. the second antenna point, to accommodate the traffic previously handled by the "beam donor", i.e. the first antenna point. In other words, the allocation is based on the previously handled traffic, as described in the current beam information and the transport resource information, and the traffic that is due to occur according to the candidate beam information.

The allocation may be done at the time $T_1-\Delta T$, where $\Delta T$ is the time needed by the transport network to actually allocate the resources to the different antenna points and $T_1$ is the time at which the first wireless device may hand over to the first candidate beam. Generally, the time $\Delta T$ can be lower or comparable to the radio TTI permitting a tight coordination between wireless devices and antenna points.

In some embodiments, the method comprises receiving a control message indicating that the first candidate beam is a candidate beam for the first wireless device, and indicating that a second amount of transport resources is required for communications over the first candidate beam. In some embodiments, the second amount of transport resources is equivalent to the first plurality of transport resources. In other words, the first wireless device requires a transfer of the services it is currently using to a different beam. In other embodiments, the second amount of resources may not be equivalent to the first plurality of resources, for example, if the quality of service the first wireless device is currently receiving is insufficient.

In some examples, the BME 602 may send the control message to the TME 601. In some embodiments, the BME 602 sends the control message if a wireless device in the network area requires a hand over to a different beam. Alternatively, the BME 602 may send the control message on a regular basis. In some embodiments, the control message may comprise information regarding all current beams and all candidate beams in the network area. In other embodiments, the control message may only comprise information relating to a particular change in the transport network information. For example, the candidate beam information, current beam information and/or transport resource information may have changed.

In some embodiments, the method comprises determining an amount of available transport resources at the second antenna point. In other words, the TME 601 determines how many resources are already available for use at the second antenna point which will be the antenna point at which the first candidate beam will be formed. The method may then comprise determining from the second amount of transport resources and the amount of available transport resources at the second antenna point, a required amount of transport resources which need to be allocated at the second antenna point such that there are resources available at the second antenna point equivalent to the second amount of transport resources. In other words, the TME 601 will determine how many more resources need to be allocated at the second antenna point such that the second antenna point can provide the first candidate beam as indicated in the received candidate beam information.

If the required amount of transport resources are available for allocation, the TME 601 may then allocate the required amount of transport resources to the second antenna point from the first plurality of transport resources. In other words, the first plurality of resources will now no longer be used by the first wireless device, as the first wireless device will now be communicating with the second antenna point. The TME 601 may therefore reallocate these resources, or at least a number of these resources, to the second antenna point.

In some cases, the TME 601 may not be able to fulfil the transport resources requirement in the candidate beam information. In these circumstances, the TME 601 may transmit a control message to the BME 602 indicating that the required amount of transport resources cannot be allocated to the second antenna point. In some aspects, the BME 602 may determine one or more beams to be used based on the information from the TME 601 that the required transport resources cannot be fulfilled.

In contrast, if the required resources can be allocated to the second antenna point, in other words, the transport resources requirement of the candidate beam information can be met, the TME 601 may transmit a control message to the BME 602 indicating that the required amount of transport resources can be allocated to the second antenna point.

Figure 7:
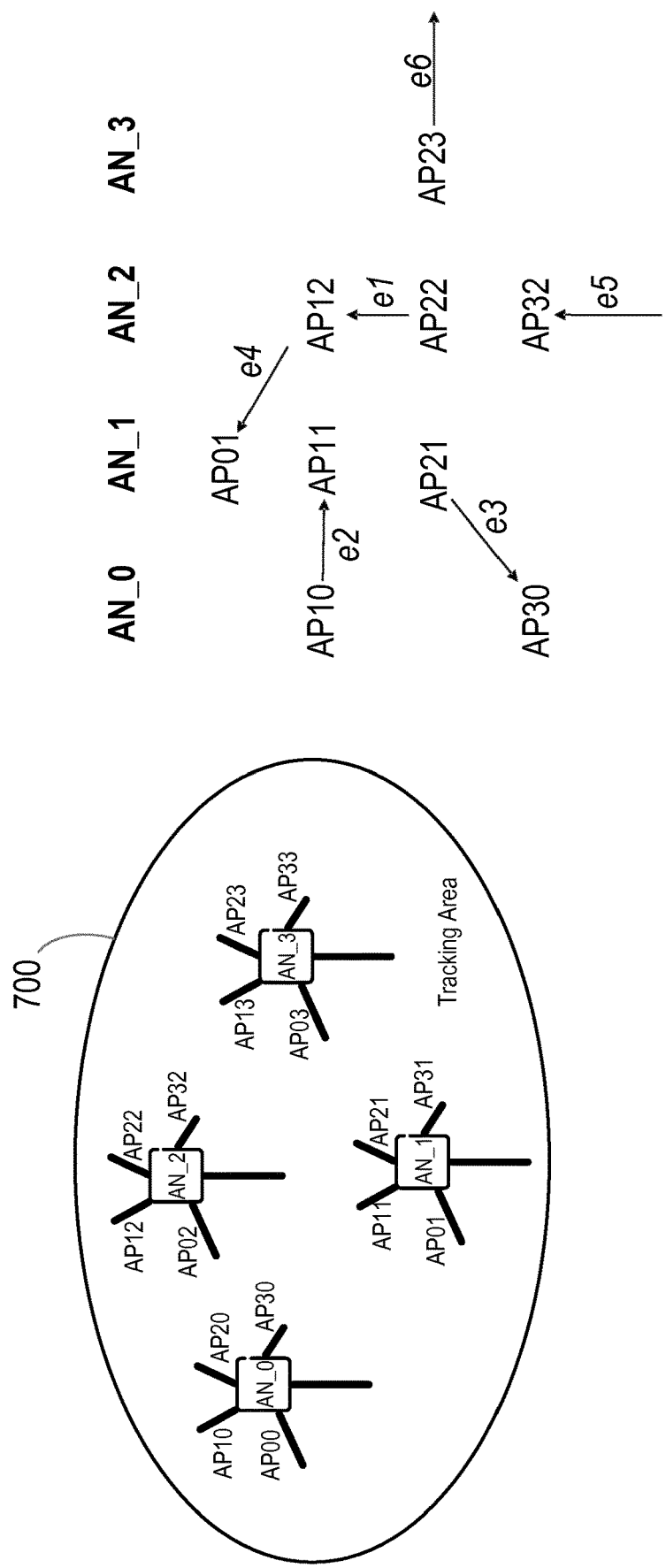
FIG. 7 illustrates example movements of wireless device within a tracking area according to some embodiments.

In some embodiments, such as the example shown in FIG. 7, more than one wireless device will be moving at any one time. The BME 602 can therefore keep track of all beam changes such that the TME 601 may take all of the wireless devices in the network area into account when allocating the transport resources. For example, the current beam information may further comprise information relating to a second beam providing communication between the second antenna point and a second wireless device. The transport resource information may further comprise a second plurality of transport resources with which the second wireless device is communicating with the second antenna point. The candidate beam information may further comprise information relating to a second candidate beam between the first antenna point and the second wireless device.

In this example, the method may further comprise allocating at least a portion of the second plurality of transport resources to one of the first antenna point and second antenna point, or between the first antenna point and second antenna point, based on the current beam information, the transport resource information and the candidate beam information. In other words, if there is a common antenna point involved in the current beam information and/or the candidate beam information for two different wireless devices, the TME 601 will allocate resources to the common antenna point depending on the requirements of both wireless devices.

The method may therefore further comprise allocating the at least a portion of the second plurality of transport resources and the at least a portion of the first plurality of transport resources such that: at least a first amount of transport resources equivalent to the first plurality of antenna resources are allocated to the first antenna point, and at least a second amount of transport resources equivalent to the second plurality of antenna resources are allocated to the second antenna point.

In other words, the resources may be reallocated such that there are enough transport resources allocated to the first antenna point and to the second antenna point to be able to provide the first candidate beam and second candidate beam with enough transport resources.

In some embodiments, it will be appreciated that in some circumstances, the allocation of transport resources will not change. In other words, if two wireless devices operating with the same number of transport resources on their respective beams effectively swap antenna points, then their movements will effectively cancel each other out.

FIG. 7 illustrates example movements of wireless devices within a tracking area 700.

The tracking area 700 in this example comprises four access nodes AN_n, i.e. the access nodes AN_0, AN_1, AN_2, and AN_3. There are in this example four antenna points, APmn connected to communicate with each of the four access nodes. In other words, for an access node AN_n there are connected the antenna points AP0n, AP1n, AP2n and AP3n. For the sake of clarity, it is presumed that the wireless devices operating within this network area are all requesting the same amount of transport resources on their connections, although it will be appreciated that the different wireless devices may request different amounts of transport resources. It will be appreciated that the network area may comprise any number of antenna points and access nodes connected in any suitable way.

The movements of wireless devices within the network area are described in this FIG. 7 by vectors ex. For example, the vector e1 describes a first wireless device moving from a beam connected to antenna point AP22 to a beam connected to antenna point AP12. These beams are both connected to the same access node AN_2 and therefore the transport resources which were allocated to the antenna point AP22 via the access node AN_2 are allocated to the antenna point AP12 via the access node AN_2. In this example, the TME may in reality need to perform no reallocation as the transport resources are already available to the antenna point AP12 via the access node AN_2.

The vector e2 describes a second wireless device moving from a beam connected to the antenna point AP10 to the antenna point AP11. As these antenna points are connected to different access nodes, i.e. the access nodes AN_0 and AN_1, this movement makes transport resources for one beam available on antenna point AP10 and access node AN_0. However, transport resources for one beam are required on antenna point AP11 and access node AN_1. Therefore, the transport resources which were allocated to antenna point AP10 for communicating with the second wireless device, may be reallocated to antenna point AP11 and access node AN_1 for communicating with the second wireless device.

However, there is also the vector e3 which describes the movement of a third wireless device from a beam connected to the antenna point AP21 to a beam connected to the antenna point AP30. As these antenna points are connected to different access nodes, i.e. the access nodes AN_1 and AN_0, this movement makes transport resources for one beam available on antenna point AP21 and access node AN_1. The movements of the second wireless device and the third wireless device therefore compensate for each other, and the TME need not re allocate any transport resources.

In other words, the second wireless device may utilize the resources on antenna point AP11 through access node AN_1, which were the resources being used by the third wireless device on antenna point AP21 through access node AN_1. Equivalently, the third wireless device may utilize the transport resources on antenna point AP30 through access node AN_0 which were the resources being used by the second wireless device on antenna point AP10 through access node AN_0.

The vector e4 describes a fourth wireless device moving from a beam connected to the antenna point AP12 to the antenna point AP01. As these antenna points are connected to different access nodes, i.e. the access nodes AN_2 and AN_1, this movement makes transport resources for one beam available on antenna point AP12 and access node AN_2. However, transport resources for one beam are required on antenna point AP01 and access node AN_1. Therefore, the transport resources which were allocated to antenna point AP12 for communicating with the fourth wireless device, may be reallocated to antenna point AP01 and access node AN_1 for communicating with the fourth wireless device.

However, there is also the vector e5 which describes the movement of a fifth wireless device from a beam connected to an antenna point outside of the network area controlled by the TME, to a beam connected to the antenna point AP32. This movement from outside of the network area therefore introduces a new requirement for transport resources on antenna point AP32 and access node AN_2. However, this fifth wireless device may make use of the transport resources freed up on access node AN_2 by the movement of the fourth wireless device on vector e4. Therefore the TME may instead allocate new transport resources to the antenna point AP01 for communication with the fourth wireless device. In some embodiments the TME may not be able to allocate these resources, and may send a control message to the BME indicating that the request cannot be accommodated.

A final vector e6 represents the movement of a sixth wireless device from the antenna point AP32 to an antenna point outside of the network area tracked and/or controlled by the TME. This movement therefore frees transport resources on the antenna point AP32 and access node AN_3 which may then be reallocated in the network. For example, they may be reallocated to the access node AN_1 and antenna point AP01 for use in communicating with the fourth wireless device.

Therefore by performing computation of new transport resources based on the candidate beam information of all wireless devices in the network area, the idea of mutual compensation of traffic from different users in the traffic areas may be taken into account. This avoids unnecessarily frequent re-allocation of transport resources.

The same method may be hierarchically applied among tracking areas, as well as inside tracking areas. As the beam moving is mostly local (inside a tracking area), it is expected that events between tracking areas are less frequent and may be scheduled over longer time intervals.

Therefore by using a TME and a BME or the method described above implemented on different entities, there is no need for the transport resources to be dimensioned to the radio peak on all of the connections, because the transport resources can be dynamically allocated when beams move. This can become even more significant when the radio traffic generated by each wireless device gets bigger because the saving of transport network resources is increased.

Figure 8:
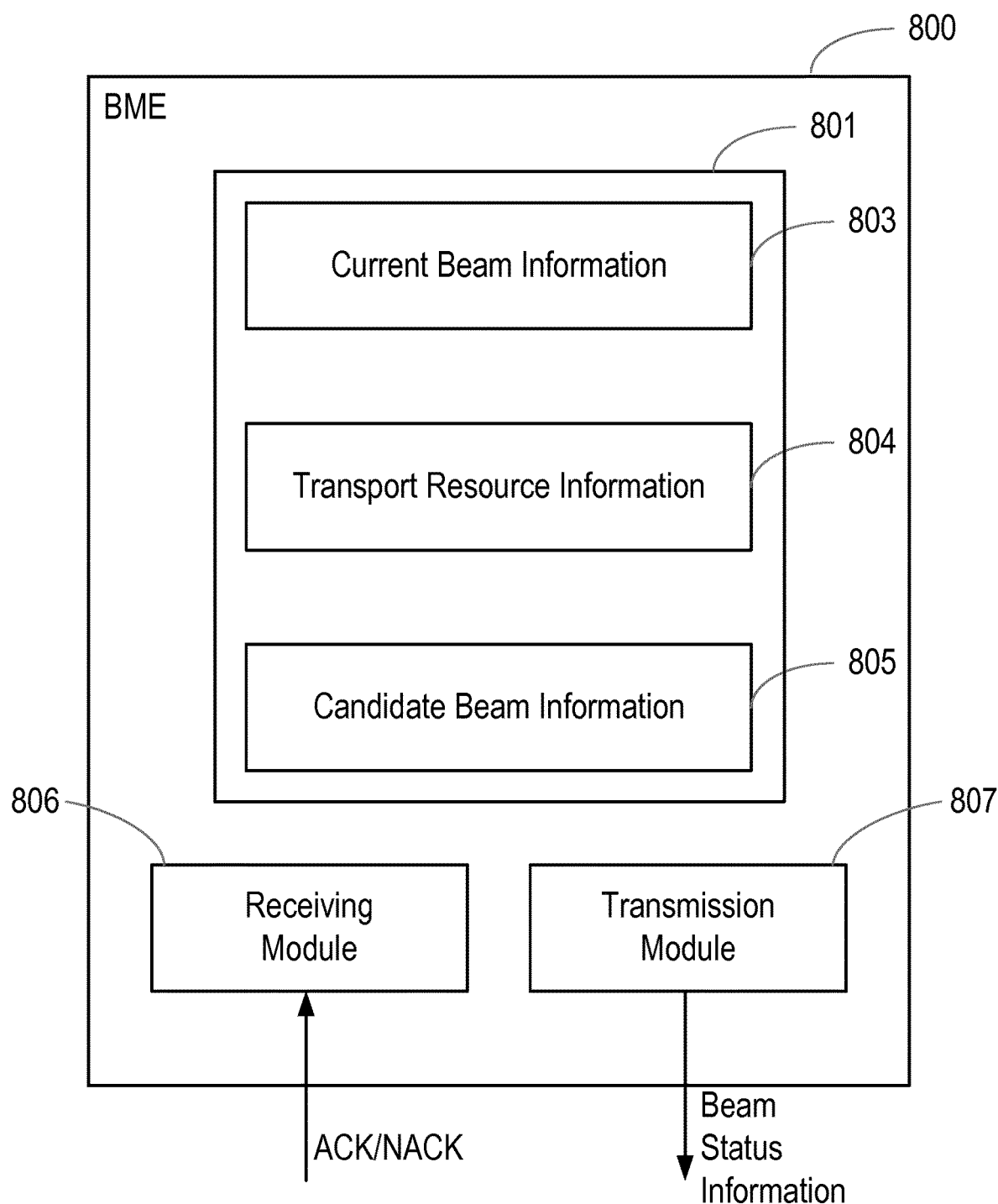
FIG. 8 illustrates a Beam Mobility Entity for storing beam status information about a wireless device communicating with antenna points in a network area according to some embodiments.

FIG. 8 illustrates an example of a Beam Mobility Entity (BME) 800 for storing beam status information about a wireless device communicating with antenna points in a network area according to some embodiments. The BME 602 of FIG. 6 may be implemented as the BME 800 as described in this Figure.

The BME 800 comprises a beam status database 801. The beam status database comprises beam status information. The beam status information may comprise current beam information 803 comprising information relating to a plurality of beams providing communication between a plurality of antenna points and wireless devices. This current beam information may be received from a radio scheduler in the radio control of the network.

The beam status information may also comprise transport resource information 804 comprising information relating to transport resources with which the wireless devices are communicating with the antenna points. Again the transport resource information 804 may be received from the radio control network.

The beam status information may then further comprise candidate beam information 805. The candidate beam information 805 comprises information relating to a plurality of candidate beams for each of the plurality of wireless devices, wherein the candidate beams are potential beams for use in future communications with each of the respective wireless devices. This candidate beam information may be received from a radio scheduler, and may be produced by the radio scheduler using an AMM procedure as described above.

In some embodiments the BME 800 further comprises a receiving module 806 configured to receive a control signal indicating that a change in beam status information has occurred and wherein the beam status database is configured to update the beam status information based on the control signal. In some embodiments the control signal is a signal from the radio network indicating that an AMM procedure has taken place, and that the candidate beams for a wireless device have changed.

In other words, when beam mobility is expected, the BME may update the beam status database 801 with the new APs and new ANs for any candidate beam.

In some embodiments the BME further comprises a transmission module 807 configured to transmit a control message comprising beam status information. For example, the control message comprising the beam status information may be sent to the TME to indicate to the TME that some reallocation of transport resources may need to occur.

The beam control message comprising the beam status information may be a synchronous event (e.g. which occurs at regular intervals) or even an asynchronous event (e.g. which occurs when at least one beam needs to be moved).

In other words, in some examples, the BME is configured to transmit the control message to the TME when at least one wireless device in the network area requires handover to a candidate beam. In some examples, the beam mobility entity is configured to transmit the control message to the TME at regular time intervals.

The BME may also be configured to receive a control message from the TME indicating whether or not the required amount of transport resources can be allocated to an antenna point. In other words indicating whether a particular wireless device will receive the required transport resources if it moves to the candidate beam specified in the beam status information.

In some examples, if the transport resources can be entirely allocated by TME, an ACK message is sent back to the BME.

In other examples, if the transport resources cannot be entirely allocated by TME, a possible partial allocation is computed and then allocated. A NACK message, with details about the transport resources not allocated, may be sent back to the BME.

By this ACK/NACK mechanism, the BME knows exactly which beams will receive a full transport connectivity and which ones a limited transport connectivity.

Figure 9:
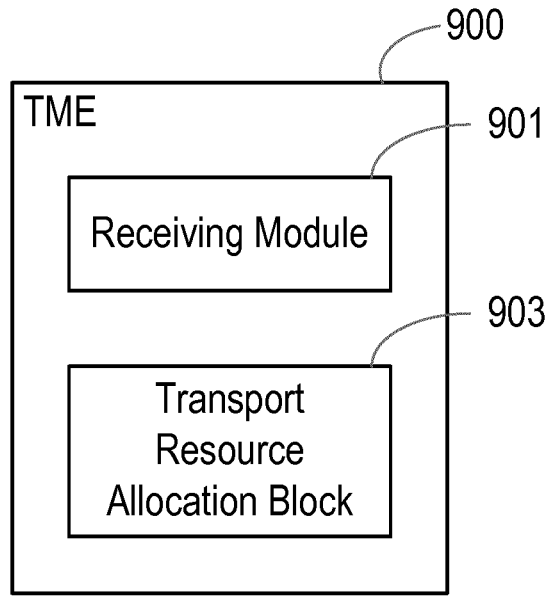
FIG. 9 illustrates an example of a transport management entity according to some embodiments.

FIG. 9 illustrates an example of a transport management entity (TME) according to some embodiments.

The TME 900 comprises a receiving module 901 for receiving candidate beam information relating to a plurality of candidate beams for use in future communications between antenna points and wireless devices. The TME 900 further comprises a transport resource allocation block 903 configured to allocate transport resources to one or more antenna points in the network area based on the candidate beam information.

Figure 10:
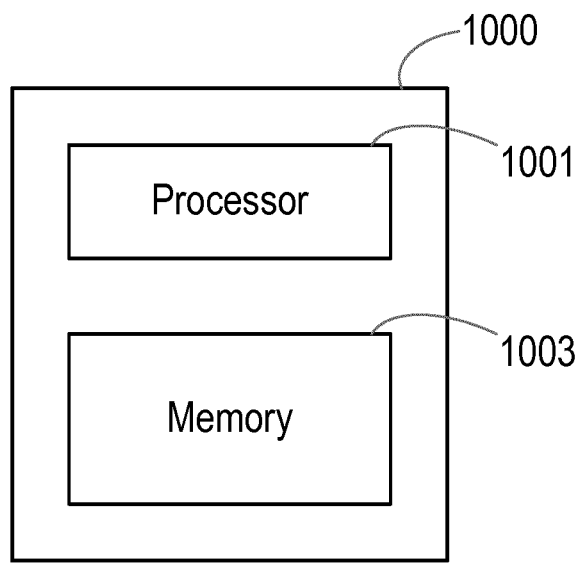
FIG. 10 shows an example of a transport management entity according to another embodiment.

FIG. 10 illustrates a transport management entity (TME) 1000 or a beam mobility entity (BME) 1000 according to some embodiments. For examples where FIG. 10 illustrates a TME 1000, the TME 1000 comprises a processor 1001 (processing circuitry) and a memory 1003, said memory 1003 containing instructions executable by said processor 1001, wherein said processor 1001 is operative to: receive candidate beam information relating to a plurality of candidate beams for use in future communications between antenna points and wireless devices. The processor 1001 is further operable to allocate transport resources to one or more antenna points in the network area based on the candidate beam information. For examples where FIG. 10 illustrates a BME 1000, the BME 1000 comprises a processor or processing circuitry 1001 and a memory 1003, configured to implement the method or features of any example. For example, the memory 1003 may be operative to store: current beam information comprising information relating to a plurality of beams providing communication between a plurality of antenna points and wireless devices; transport resource information comprising information relating to transport resources with which the wireless devices are communicating with the antenna points; and candidate beam information comprising information relating to a plurality of candidate beams for each of the plurality of wireless devices, wherein the candidate beams are potential beams for use in future communications with each of the respective wireless devices.

The TME and BME may be located separately or co-located, may be integrated with any other node in the access network or transport network, or may be implemented in one or more remote or cloud based location(s).

There is therefore provided methods and apparatus for allocating transport resources to beams in a network area. Such a transport resources allocation is performed using candidate beam information which provides an indication of changes in radio traffic distribution. Two new system functions, referred to herein as a Beam Mobility Entity (BME) and a Transport Management Entity (TME), may be used to implement the method in a conventional RAN architecture as plugins of radio control and transport control functions.

This means that the existing radio network controller's and transport controller's architectures may not impacted by the proposed enhancement, as two novel system functions have been introduced to interface the existing ones.

The invention claimed is:

1. A method of allocating transport resources to beams in a network area, wherein the beams comprise beam formed radio channels between antenna points and wireless devices in the network area, the method comprising:
    identifying, for one or more wireless devices being currently served by a beam, a next serving beam that will serve the wireless device after performing a handover from a current serving beam to the next serving beam;
    predicting which nodes of the network will require more or less transport resources than currently allocated for transporting data between the antenna points and a network based on which of the beams are the current serving beams and which are the next serving beams; and
    reallocating transport resources to one or more antenna points in the network area based on the prediction.

2. The method of claim 1, wherein the method comprises:
receiving current beam information comprising information relating to a first beam providing communication between a first antenna point and a first wireless device;
receiving transport resource information comprising information relating to a first plurality of transport resources with which the first wireless device is communicating with the first antenna point;
receiving candidate beam information comprising information relating to a first candidate beam between a second antenna point and the first wireless device; and
allocating at least a portion of a first plurality of transport resources to one of the first antenna point and second antenna point, or between the first antenna point and second antenna point, based on the current beam information, the transport resource information, and the candidate beam information.

3. The method of claim 2, wherein the receiving current beam information, the receiving candidate beam information, and the receiving transport resource information comprises:
receiving a control message indicating that the first candidate beam is a candidate beam for the first wireless device, and indicating that a second amount of transport resources is required for communications over the first candidate beam.

4. The method of claim 3, wherein the allocating at least a portion of the first plurality of transport resources comprises allocating a portion of the first plurality of resources to the second antenna point such that at least the second amount of transport resources is allocated at the second antenna point.

5. The method of claim 4, further comprising
determining an amount of available transport resources at the second antenna point;
determining from the second amount of transport resources and the amount of available transport resources at the second antenna point, a required amount of transport resources which need to be allocated at the second antenna point such that there are resources available at the second antenna point equivalent to the second amount of transport resources; and
allocating the required amount of transport resources to the second antenna point from the first plurality of transport resources.

6. The method of claim 3, wherein the receiving the control message comprises receiving the control message when at least one wireless device in the network area requires handover or at regular time intervals.

7. The method of claim 2:
wherein the current beam information comprises information relating to a second beam providing communication between the second antenna point and a second wireless device;
wherein the transport resource information comprises a second plurality of transport resources with which the second wireless device is communicating with the second antenna point;
wherein the candidate beam information comprises information relating to a second candidate beam between the first antenna point and the second wireless device; and
further comprising allocating at least a portion of the second plurality of transport resources to one of the first antenna point and second antenna point, or between the first antenna point and second antenna point, based on the current beam information, the transport resource information and the candidate beam information.

8. The method of claim 7, wherein the method comprises allocating the at least a portion of the second plurality of transport resources and the at least a portion of the first plurality of transport resources such that:
at least a first amount of transport resources equivalent to the first plurality of antenna resources are allocated to the first antenna point; and
at least a second amount of transport resources equivalent to the second plurality of antenna resources are allocated to the second antenna point.

9. The method of claim 2, further comprising:
sending a request to the first wireless device to perform measurements of a plurality of candidate beams;
receiving signaling from the first wireless device representative of the measurements on the plurality of candidate beams; and
selecting the first candidate beam from the plurality of candidate beams based on the received signaling from the first wireless device.

10. A transport management entity, comprising:
processing circuitry;
memory containing instructions executable by the processing circuitry whereby the transport management entity is operative to:
identify, for one or more wireless devices being currently served by a beam, a next serving beam that will serve the wireless device after performing a handover from a current serving beam to a next serving beam;
predict which nodes of the network will require more or less transport resources than currently allocated for transporting data between the antenna points and a network based on which of the beams are the current serving beams and which are the next serving beams; and
reallocate transport resources to one or more antenna points in the network area based on the prediction.

11. The transport management entity of claim 10, wherein the instructions are such that the transport management entity is operative to:
receive current beam information comprising information relating to a first beam providing communication between a first antenna point and a first wireless device;
receive transport resource information comprising information relating to a first plurality of transport resources with which the first wireless device is communicating with the first antenna point;
receive candidate beam information comprising information relating to a first candidate beam between a second antenna point and the first wireless device; and
allocate at least a portion of the first plurality of transport resources to one of the first antenna point and second antenna point, or between the first antenna point and second antenna point, based on the current beam information, the transport resource information, and the candidate beam information.

12. A beam mobility entity, comprising:
processing circuitry;
memory containing instructions executable by the processing circuitry whereby the beam mobility entity is operative to store:
a next beam, for one or more wireless devices being currently served by a current serving beam that will serve the wireless device after performing a handover from the current serving beam to the next serving beam;

a prediction of which nodes of the network will require more or less transport resources than currently allocated for transporting data between the antenna points and a network based on which of the beams are the current serving beams and which are the next serving beams; and one or more transport resources to be reallocated to one or more antenna points in the network area based on the prediction.

13. The beam mobility entity of claim 12, wherein the instructions are such that the beam mobility entity is operative to:

receive a first control signal indicating that a change in current beam information, transport resource information, and/or candidate beam information has occurred; and update the current beam information, the transport resource information, and/or the candidate beam information based on the control signal.

14. The beam mobility entity of claim 13, wherein the instructions are such that the beam mobility entity is operative to:

transmit a control message with beam status information comprising the current beam information, the transport resource information, and the candidate beam information;

wherein the transmitting the beam status information is performed at regular time intervals and/or in response to at least one wireless device in the network area requiring handover to a candidate beam.

15. The beam mobility entity of claim 14, wherein the instructions are such that the beam mobility entity is operative to receive a second control signal indicating whether the at least one wireless device can handover to the candidate beam with a required amount of transport resources.

* * * * *